United States Patent [19]
Schneider

[11] Patent Number: 4,768,692
[45] Date of Patent: Sep. 6, 1988

[54] END CAP AND TIE DOWN ASSEMBLY FOR ARTICLE CARRIER

[75] Inventor: William Schneider, Detroit, Mich.

[73] Assignee: Four Star Corporation, Warren, Mich.

[21] Appl. No.: 890,096

[22] Filed: Jul. 28, 1986

[51] Int. Cl.$^4$ ............................................... B60R 9/04
[52] U.S. Cl. ..................................................... 224/326
[58] Field of Search ......................... 224/326, 309-331

[56] References Cited

U.S. PATENT DOCUMENTS

| | | | |
|---|---|---|---|
| 4,055,284 | 10/1977 | Bott | 224/326 |
| 4,170,322 | 10/1979 | Bott | 224/326 |
| 4,343,419 | 8/1982 | Mareydt | 224/326 |
| 4,431,123 | 2/1984 | Bott | 224/324 X |
| 4,432,478 | 2/1984 | Bott | 224/324 X |
| 4,501,386 | 2/1985 | Rasor et al. | 224/326 |
| 4,534,496 | 8/1985 | Bott | 224/326 |

Primary Examiner—Henry J. Recla
Assistant Examiner—Robert M. Petrik
Attorney, Agent, or Firm—Krass & Young

[57] ABSTRACT

An end cap and tie down for use with a hollow slat of the type including a base portion adapted to be mounted in contiguous relation to a surface portion of a vehicle and a longitudinally extending slot in the upper surface of the slat communicating with the hollow interior of the slat. The end cap includes a main body portion having a height exceeding the height of the slat and defining a generally vertical abutment surface positioned against a terminal end of the slat to close that end of the slat and position the upper surface of the main body portion above the upper surface of the slat, and an attachment portion projecting from the abutment surface of the main body portion and sized to be received in the hollow of the slat. The tie down is positioned on the slat adjacent the terminal end of the slat in abutting relation to the end cap member and includes a key portion slidably received in the hollow of the slat, an eyelet portion positioned slidably on the upper surface of the slat and a bridge portion positioned slidably in the slot of the slat. The upper surface of the eyelet portion is positioned at the height of the upper surface of the main body portion of the end cap member and has a cross-sectional configuration generally conforming to the cross-sectional configuration of the upper surface of the main body portion of the end cap member.

6 Claims, 2 Drawing Sheets

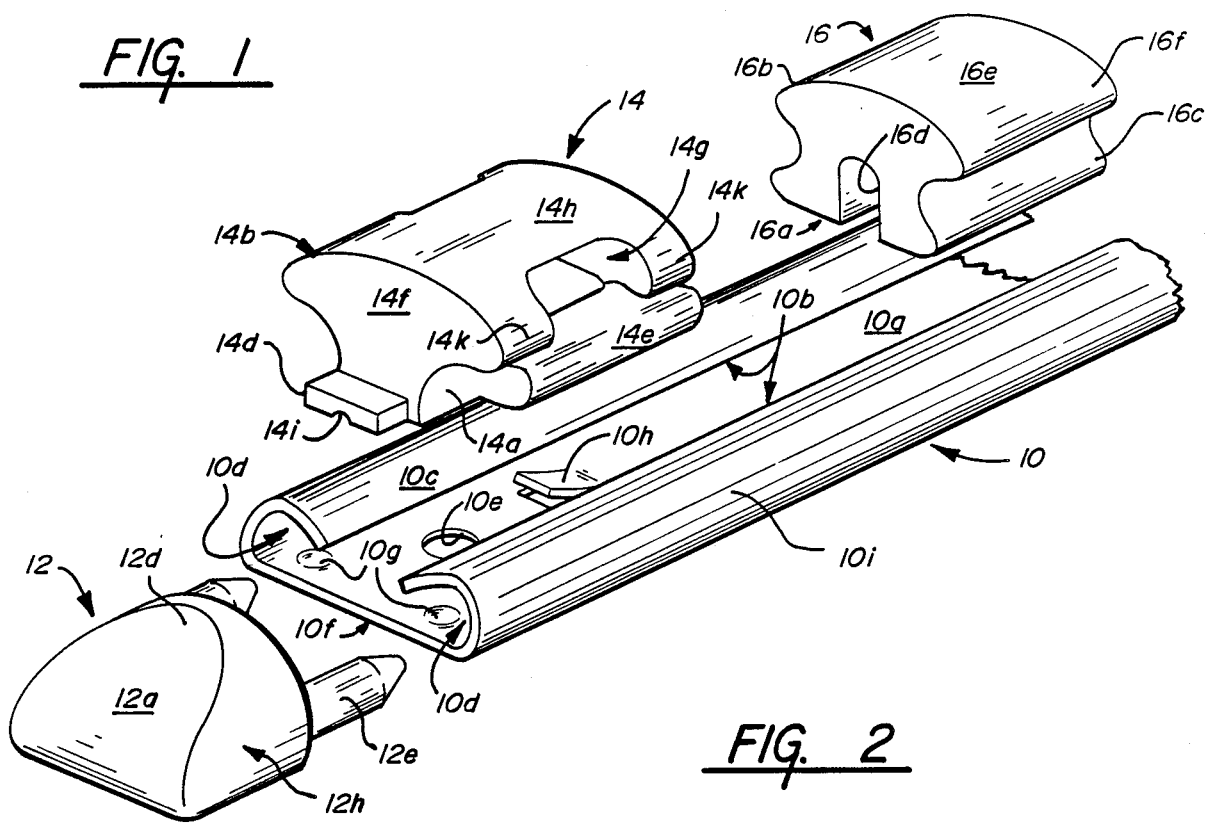
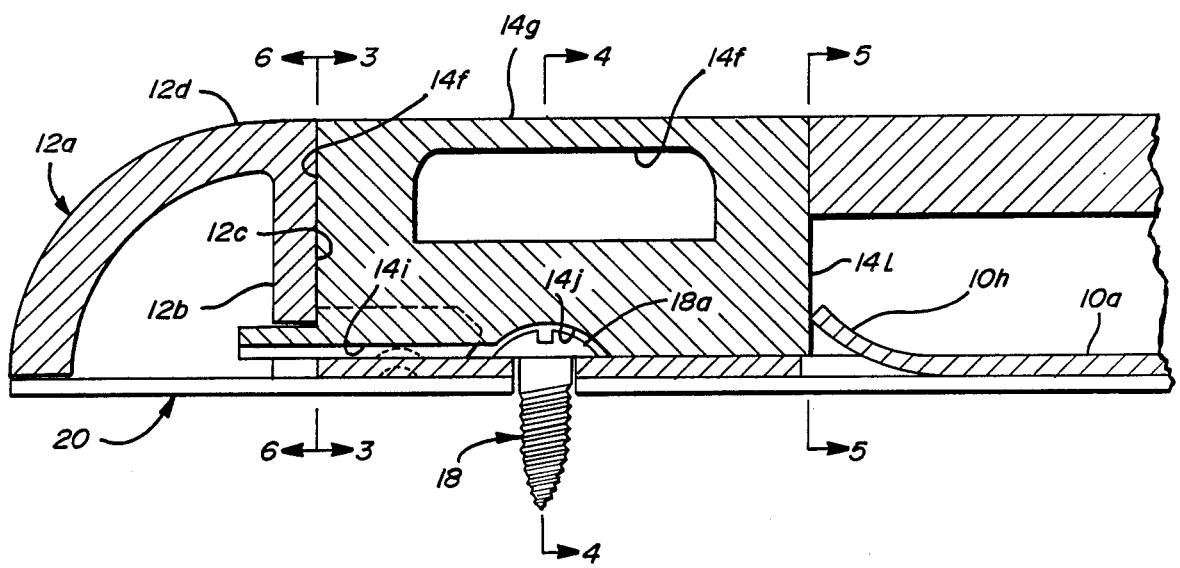
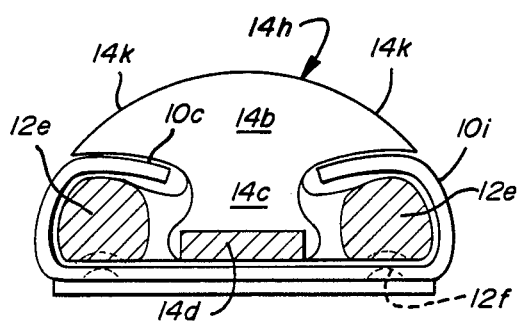
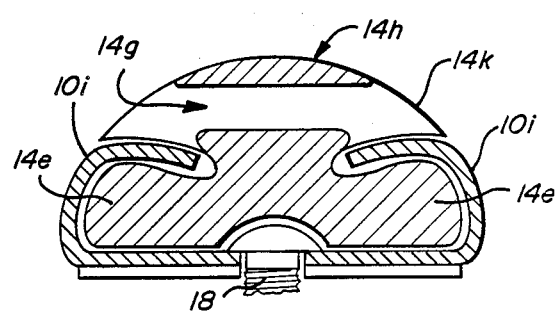

END CAP AND TIE DOWN ASSEMBLY FOR ARTICLE CARRIER

BACKGROUND OF THE INVENTION

This invention relates to article carrier assemblies for use on automotive vehicles and, more particularly, to a combination end cap and tie down assembly for use with a slat of an automotive article carrier.

Slats which are mounted in contiguous relation to a surface portion of a vehicle are in common use as a component of an automotive article carrier. The slats typically have a uniform cross section throughout their length so that their terminal ends are exposed. Various designs have been proposed for end cap members to be positioned against the terminal ends of the slats to close the ends of the slats to present a more aerodynamic overall structure and a more aesthetically pleasing effect. Various end cap designs have also been proposed wherein a tie down provision is included in the end cap design so that straps or other tie down devices may be passed through the tie down aspect of the end cap to facilitate securing articles on the automotive article carrier. Whereas certain of these combination end cap and tie down designs have achieved a limited degree of success, these combination designs tend to suffer from one or more shortcomings. Specifically, they either fail to provide a satisfactory closure for the terminal end of the slat; or they fail to provide a tie down structure able to withstand the severe tension loading imposed by the article retaining straps; or the overall profile of the combination is aerodynamically inefficient; or the overall appearance of the combination is aesthetically displeasing.

SUMMARY OF THE INVENTION

This invention is directed to the provision of an improved automotive article carrier assembly.

More specifically, this invention is directed to the provision of a combination end cap and tie down assembly for use with an automotive article carrier which adequately closes the terminal end of the slat, provides adequate strength to withstand the tension loading of the article restraining devices, presents a smooth overall aerodynamic profile, and presents a pleasing overall aesthetic appearance.

The end cap and tie down assembly of the invention is adapted for use with a hollow elongated slat of the type including a base portion adapted to be mounted in contiguous relation to a surface portion of a vehicle and a longitudinally extending slot in the upper surface of the slat communicating with the hollow interior of the slat. The assembly includes an end cap member and a separate tie down member. The end cap member includes a main body portion having a height exceeding the height of the slat and defining a generally vertical abutment surface adapted to be positioned against a terminal end of the slat to close that end of the slat and position the upper surface of the main body portion above the upper surface of the slat, and an attachment portion projecting longitudinally from the abutment surface of the main body portion and sized to be received in the hollow of the terminal end of the slat. The tie down member is positioned on the slat adjacent the terminal end of the slat in abutting relation to the end cap member and includes an eyelet portion defining a transverse opening above the upper surface of the slat for receipt of a tie down device. The eyelet portion has an upper surface that is positioned generally at the height of the upper surface of the main body portion of the end cap member and that has a cross-sectional configuration generally conforming to the cross-sectional configuration of the upper surface of the main body portion of the end cap member. The end cap member and tie down member thus coact to define a generally flush, continuous upper surface to optimize aerodynamic considerations and to present a pleasing aesthetic configuration.

According to a further feature of the invention, the portions of the slat at opposite sides of the slot are turned downwardly toward the base portion of the slat to define a pair of channels at opposite sides of the slot, and the attachment portion of the end cap member includes a pair of transversely spaced fingers projecting from the abutment surface and sized to fit respectively in the channels of the slat. This arrangement allows a convenient means of mounting the end cap member in abutting relation to the terminal end of the slat and in abutting relation to the tie down member.

According to a further feature of the invention, a depression is provided in the lower face of each finger for snapping coaction with a dimple formed in the base portion of the slat to secure the fingers within the channels and maintain the abutment surface of the end cap member against the terminal end of the slat.

According to a further feature of the invention, the tie down member further includes a key portion positioned slideably in the hollow of the slat, and the end of the key portion adjacent the end cap member is cut away along its opposite longitudinal edges to accommodate the fingers of the end cap member.

According to a further feature of the invention, a tab is struck upwardly from the base portion of the slat and the tab is positioned to snap into abutting locking relation to the end of the tie down member remote from the end cap member as the tie down member is slid into abutting relation with the end cap member. This arrangement provides an inexpensive and effective means of locking the tie down member in the terminal end of the slat in abutting relation to the end cap member.

According to a further feature of the invention, the assembly further includes an elongated elastomeric insert positioned on the slat in abutting relation to the tie down member and having an upper surface that is positioned at the height of the upper surfaces of the end cap member and the tie down member and that has a cross-sectional configuration generally corresponding to the cross-sectional configuration of the upper surfaces of the end cap member and the tie down member. This arrangement allows the end cap member, tie down member, and elastomeric insert to coact to define a generally flush, continuous, upper surface for the assembly to maximize aerodynamic considerations and present a pleasing overall appearance.

BRIEF DESCRIPTION OF THE DRAWINGS

FIG. 1 is an exploded perspective view of the invention article carrier assembly;

FIG. 2 is a longitudinal cross-sectional view showing the components of the article carrier assembly in their assembled relationship;

FIGS. 3, 4, 5 and 6 are cross-sectional views taken respectively on lines 3—3, 4—4, 5—5 and 6—6 of FIG. 2;

DETAILED DESCRIPTION OF THE PREFERRED EMBODIMENT

Figure 5:
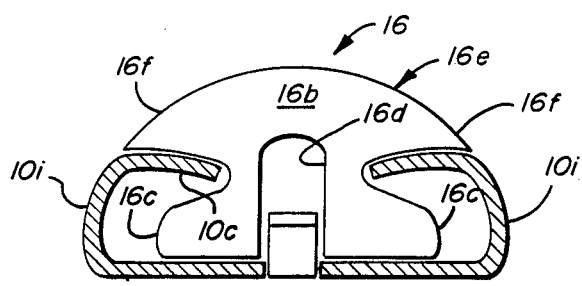
Figure 6:
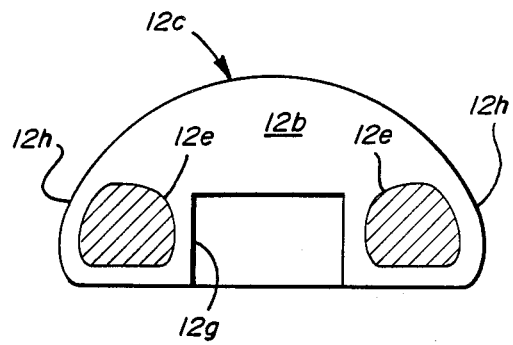
Figure 7:
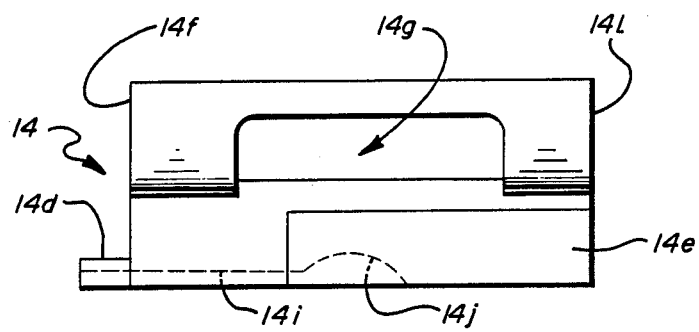
FIGS. 7 and 8 are side elevational and bottom views respectively of the tie down member component of the article carrier assembly.
Figure 8:
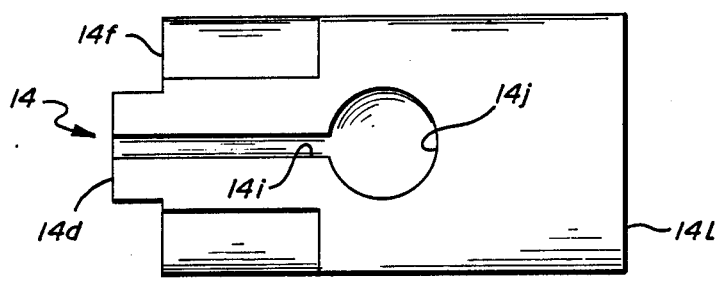
Figure 9:
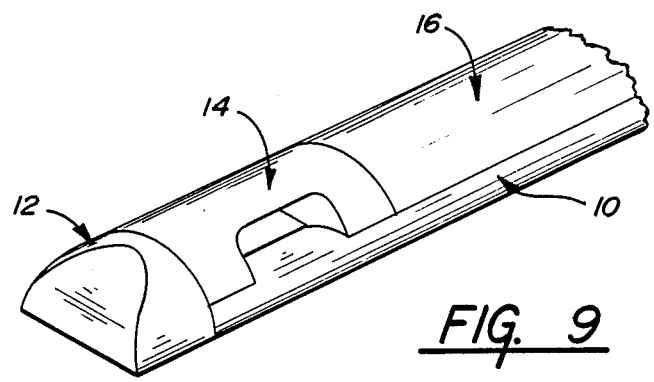
FIG. 9 is a perspective view, on a reduced scale, showing the components in their assembled relationship.

The automotive article carrier assembly of the invention includes a slat 10; an end cap member 12; a tie down member 14; and an insert 16.

Slat 10 is preferably formed as a rolled sheet metal member and includes a base portion 10a adapted to be mounted in contiguous relation to a surface portion of a vehicle and a longitudinally extending slot 10b in the upper surface of the slat communicating with the hollow interior of the slat. The portions 10c of the upper surface of the slat at opposite sides of the slot 10b are turned downwardly toward the base portion of the slat to define a pair of channels 10d at opposite sides of the slot. A hole 10e is formed in the base portion of the slat adjacent the terminal end 10f of the slat; a pair of upstanding dimples 10g are formed in the base portion of the slat adjacent terminal end 10f in respective alignment with opposite channels 10d; and a tab 10h is struck upwardly from base portion 10a upstream of aperture 10e. Aperture 10e is tapered to accommodate a round headed sheet metal screw 18 to secure the slat to the vehicle surface. Tab 10h is positioned on the center line of the slat and angles upwardly in the direction of terminal end 10f.

End cap member 12 is preferably formed of a molded plastics material and incudes a hollow main body portion 12a having a height exceeding the height of the slat. Member 12 further includes a vertical partition portion 12b defining a generally vertical abutment surface 12b adapted to be positioned against terminal end 10f of the slat to close that end of the slat and position the upper surface 12d of the main body portion above the upper surface of the slat. End cap member 12 further includes a pair of integral fingers 12e projecting longitudinally from abutment surface 12c in laterally spaced relation and sized to be received in respective channels 10d of the slat. A depression 12f is provided in the lower face of each finger 12e for snapping coaction with respective dimples 10g. Fingers 12e, as best seen in FIG. 3, fit snuggly in channels 10d so that the dimples 10g snap crisply into depressions 12f as the fingers are inserted into the channels. The combined tight fit of the fingers within the channels and the interengagement of dimples 10g with depressions 12f maintains the end cap firmly in position against the terminal end of the slat. A downwardly opening cut out 12g is provided in partition portion 12b between laterally spaced fingers 12e.

Tie down member 14 is formed of a molded plastics material and is positioned on the slat in abutting relation to abutment surface 12b of end cap member 12. Tie down member 14 includes a key portion 14a slideably received in the hollow of the slat; an eyelet portion 14b slideably positioned above the slat; a bridge portion 14c positioned slideably in the slot 10b and rigidly interconnecting key and eyelet portions 14a and 14b; and a pilot portion 14d.

Key portion 14a is sized and configured to fit slideably within the hollow of the slat with wing portions 14e thereof respectively slideably positioned in channels 10d. Wing portions 14e of key portion 14a terminate short of the end 14f of the tie down member to accommodate fingers 12e in the assembled relation of the end cap member and the tie down member.

Tie down portion 14b of the tie down member defines a transverse opening 14g above the upper surface of the slat for receipt of a suitable tie down device such as a strap, and has an upper surface 14h that is positioned generally at the height of the upper surface 12d of the main body portion of the end cap member and that has a cross-sectional configuration generally conforming to the cross-sectional configuration of the upper surface 12c of the main body portion of the end cap member to define a generally flush, continuous upper surface therewith.

Pilot portion 14d is sized to fit snugly within the upper portion of cut out 12g in the end cap member in the assembled relation of the components.

Slat 10, end cap member 12, and tie down member 14 are typically delivered to a customer with the tie down member slideably received in the slat at a location upstream from tab 10h and with the end cap member disassembled from the slat. To install the assembly on a vehicular surface, slat 10 is positioned on the vehicular surface, screw 18 is passed through aperture 10e and through an aligned aperture in a mounting pad 20 for engagement with the surface of the vehicle, fingers 12e of end cap member 12 are inserted into channels 10d to snappingly engage depressions 12f with dimples 10g and lockingly secure the end cap to the terminal end of the slat, and tie down member 14 is slid downstream within the slat and over upstanding tab 10h into abutting engagement with abutment surface 12c of the end cap member with pilot portion 14d guiding snugly into cut out 12g in the end cap member. As the tie down member assumes its position of abutting engagement with the end cap member, tab 10h clears the remote end 14h of the tie down member and snaps upwardly to the position seen in FIG. 2 in which it lockingly engages surface 14h to preclude sliding movement of the tie down member within the slat and maintain the tie down member in its position of firm abutting engagement with the end cap member. Further, as the tie down member is slid downstream toward the end cap member, the rounded head 18a of screw 18 enters and guides axially along a pilot axial groove 14i opening in the lower face of the tie down member. Groove 14i is shallower than the height of screw head 18a so that the tie down member must flex upwardly slighly to allow the screw head to move axially along the groove 14i. As the tie down member assumes its position of abutting engagement with the end cap member, screw head 18a enters snappingly into a conforming dome shaped depression 14j formed at the end of groove 14i to further preclude sliding movement of the tie down member within the slat.

Because the upper surface 12d of the end cap member is at the same height as the upper surface 14h of the tie down member, and because the upper surfaces 12c and 14h have substantially corresponding cross-sectional configurations, the end cap member and tie down member cooperate with the slat to define a smooth, low profile, aerodynamic configuration for the terminal end of the slat. This low profile, smooth continuous surface minimizes the aerodynamic drag presented by the article carrier assembly and imparts a pleasing aesthetic appearance to the article carrier assembly. The smooth, continuous aspect of the assembly is further augmented by the fact that the lower arcuate side portions 12h of the end cap member have a slope and configuration substantially matching the slope and configuration of the side walls 10i of the slat and by the further fact that the lower arcuate portions 14k of the eyelet portion of the tie down member blend smoothly into, and provide arcuate continuity with respect to, the arcuate side walls 10i of the slat.

Insert 16 is preferably formed of an elastomeric material and includes a base or key portion 16a slideably received in the hollow of the slat and a main body portion 16b positioned above the slat. Base portion 16a includes opposite wing portions 16c respectively slideably received in slat channels 10d and a central slot 16d extending the full length of the insert. The upper surface 16e of the main body portion 16b is positioned at the height of the upper surfaces 12d and 14h of the end cap member and tie down member and has a cross-sectional configuration generally conforming to the cross-sectional configuration of upper surfaces 12d and 14h so as to form a smooth, continuation of the overall assembly profile defined by the end cap member, slat, and tie down member. The smooth, continuous aspect of the assembly is further augmented by the fact that the lower arcuate surfaces 16f of the main body portion of the insert blend smoothly into the arcuate side surfaces 10i of the slat.

In the assembled relation of the insert, the insert is abutted against the end 14h of the tie down member with the tab 10h positioned in slot 16d of the insert. It will be understood that the insert, although illustrated as having a minor length, will in fact ordinarily extend the full length of the slat so as to provide a cushioning member for articles carried by the slat.

It will be seen that the invention article carrier assembly provides a simple and inexpensive means of capping the terminal end of the slat and providing a strong tie down provision at the terminal end of the slat. The slat, end cap member, and tie down member coact to define a smooth, low profile assembly at the terminal end of the slat to minimize wind resistance and optimize the aesthetic aspects of the assembly. The eyelet portion of the tie down member presents a stiff, strong construction which will readily withstand the tension loading imposed by the tie down devices, and the tie down member is firmly precluded from upstream movement along the slat by the simple expedient of the struck tab engaging the end of the tie down member. The elastomeric insert cooperates with the tie down member, end cap, and slat to further define a low profile aerodynamic assembly which, with the inclusion of the elastomeric insert, functions to close the terminal end of the slat, provide a strong tie down provision, and provide cushioning for articles disposed on the slat.

Whereas a preferred embodiment of the invention has been illustrated and described in detail, it will be apparent that various changes may be made in the disclosed embodiment without departing from the scope or spirit of the invention.

I claim:

1. An end cap and tie down assembly for use with a hollow elongated slat of the type including a base portion adapted to be mounted in contiguous relation to a horizontal surface portion of a vehicle and a longitudinally extending slot in the upper surface of the slat communicating with the hollow interior of the slat, said assembly comprising:
   (A) an end cap member including:
   (1) A main body portion having a height exceeding the height of the slat and defining a generally vertical abutment surface at one end thereof adapted to be positioned against a terminal end of the slat to close that end of the slat and position the upper surface of the main body portion above the upper surface of the slat; and
   (2) an attachment portion projecting longitudinally from said abutment surface of said main body portion and sized to be received in the hollow of the slat; and
   (B) a tie down member positioned on the slat adjacent the terminal end thereof in abutting relation to said end cap member and including an eyelet portion,
   (1) having an upper surface extending generally horizontally from one end to a second end thereof,
   (2) defining a transverse opening below said upper surface thereof and above the upper surface of the slat for receipt of a tie down device,
   (3) defining a generally vertical abutment surface at said one end thereof below said upper surface thereof for abutting engagement above said slat with said generally vertical abutment surface on said main body portion of said end cap member,
   (4) having a height such that said upper surface thereof is positioned generally at the upper surface of the main body portion of said end cap member, and
   (5) having a cross-sectional configuration at the point of abutment with the end cap that generally conforms to the cross-sectional configuration of the abutting upper surface of the main body portion of said end cap member to define a generally flush, continuous upper surface thereof,
   (C) the portions of the upper surface of the slat at opposite sides of the slot being turned downwardly toward the base portion of the slat to define a pair of channels at opposite sides of the slot;
   (D) said attachment portion of said end cap member including a pair of transversely spaced fingers projecting from said end cap abutment surface and sized to fit respectively in said channels; and
   (E) a depression being provided in the lower face of each finger for snapping coaction with a dimple formed in the base portion of the slat to secure said fingers within the channels and maintain said abutment surface against the terminal end of the slat.

2. An end cap and tie down assembly for use with a hollow elongated slat of the type including a base portion adapted to be mounted in contiguous relation to a horizontal surface portion of a vehicle and a longitudinally extending slot in the upper surface of the slat communicating with the hollow interior of the slat, said assembly comprising:
   (A) an end cap member including:
   (1) A main body portion having a height exceeding the height of the slat and defining a generally vertical abutment surface at one end thereof adapted to be positioned against a terminal end of the slat to close that end of the slat and position the upper surface of the main body portion above the upper surface of the slat; and
   (2) an attachment portion projecting longitudinally from said abutment surface of said main body portion and sized to be received in the hollow of the slat; and (B) a tie down member positioned on the slat adjacent the terminal end thereof in abutting relation to said end cap member and including an eyelet portion,
  (1) having an upper surface extending generally horizontally from one end to a second end thereof,
  (2) defining a transverse opening below said upper surface thereof and above the upper surface of the slat for receipt of a tie down device,
  (3) defining a generally vertical abutment surface at said one end thereof below said upper surface thereof for abutting engagement above said slat with said generally vertical abutment surface on said main body portion of said end cap member,
  (4) having a height such that said upper surface thereof is positioned generally at the upper surface of the main body portion of said end cap member, and
  (5) having a cross-sectional configuration at the point of abutment with the end cap that generally conforms to the cross-sectional configuration of the abutting upper surface of the main body portion of said end cap member to define a generally flush, continuous upper surface thereof,
(C) the portions of the upper surface of the slat at opposite sides of the slot being turned downwardly toward the base portion of the slat to define a pair of channels at opposite sides of the slot;
(D) said attachment portion of said end cap member including a pair of transversely spaced fingers projecting from said end cap abutment surface and sized to fit respectively in said channel;
(E) said tie down member further including a key portion positioned slidably in the hollow of the slat; and
(F) the end of said key portion adjacent said end cap member being cut away along its opposite longitudinal edges to accommodate said fingers.

3. An automotive article carrier assembly comprising:
(A) a hollow slat including a base portion adapted to be mounted in contiguous relation to a horizontal surface portion of a vehicle and a longitudinally extending slot in the upper surface of the slat communicating with the hollow interior of the slat;
(B) an end cap member including,
  (1) a main body portion having a height exceeding the height of said slat and defining a generally vertical abutment surface at one end thereof positioned against a terminal end of said slat to close that end of said slat and position the upper surface of the main body portion above the upper surface of said slat; and
  (2) an attachment portion projecting from said abutment surface of said main body portion and sized to be received in the hollow of said slat; and
(C) a tie down member positioned on said slat adjacent said terminal end thereof in abutting relation to said end cap member and including an eyelet portion,
  (1) having an upper surface extending generally horizontally from one end to a second end thereof,
  (2) defining a transverse opening below said upper surface thereof and above the upper surface of said slat for receipt of a tie down device,
  (3) defining a generally vertical abutment surface at said one end thereof below said upper surface thereof for abutting engagement above said slat with said generally vertical abutment surface on said main body portion of said end cap member,
  (4) having a height such that said upper surface thereof is positioned at the height of the upper surface of the main body portion of the end cap member, and
  (5) having a cross-sectional configuration at the point of abutment with the end cap member that generally conforms to the cross-sectional configuration of the abutting upper surface of the main body portion of said end cap member to define a generally flush, continuous upper surface therewith,
(D) the portion of the upper surface of said slat at opposite sides of said slot being turned downwardly toward said slat based portion to define a pair of channels at opposite sides of said slot;
(E) said attachment portion of said end cap member including a pair of transversely spaced fingers projecting from said abutment surface and sized to fit respectively in said channels;
(F) a pair of laterally spaced dimples being provided in said slat base portion adjacent said terminal end thereof; and
(G) a depression being provided on the lower face of each finger for snapping coaction with a respective dimple as the fingers are inserted into said channels.

4. An automotive article carrier assembly comprising:
(A) a hollow slat including a base portion adapted to be mounted in contiguous relation to a horizontal surface portion of a vehicle and a longitudinally extending slot in the upper surface of the slat communicating with the hollow interior of the slat;
(B) an end cap member including,
  (1) a main body portion having a height exceeding the height of said slat and defining a generally vertical abutment surface at one end thereof positioned against a terminal end of said slat to close that end of said slat and position the upper surface of the main body portion above the upper surface of said slat; and
  (2) an attachment portion projecting from said abutment surface of said main body portion and sized to be received in the hollow of said slat; and
(C) a tie down member positioned on said slat adjacent said terminal end thereof in abutting relation to said end cap member and including an eyelet portion,
  (1) having an upper surface extending generally horizontally from one end to a second end thereof,
  (2) defining a transverse opening below said upper surface thereof and above the upper surface of said slat for receipt of a tie down device,
  (3) defining a generally vertical abutment surface at said one end thereof below said upper surface thereof for abutting engagement above said slat with said generally vertical abutment surface on said main body portion of said end cap member,
  (4) having a height such that said upper surface thereof is positioned at the height of the upper surface of the main body portion of the end cap member, and (5) having a cross-sectional configuration at the point of abutment with the end cap member that generally conforms to the cross-sectional configuration of the abutting upper surface of the main body portion of said end cap member to define a generally flush, continuous upper surface therewith, (D) the portion of the upper surface of said slat at opposite sides of said slot being turned downwardly toward said slat base portion to define a pair of channels at opposite sides of said slot;

(E) said attachment portion of said end cap member including a pair of transversely spaced fingers projecting from said abutment surface and sized to fit respectively in said channels;

(F) said tie down member further including a key portion positioned slidably in the hollow of said slat; and (G) the end of said key portion adjacent said end cap member being cut away along its opposite longitudinal edges to accommodate said fingers.

5. An automotive article carrier assembly comprising:
(A) a hollow slat including a base portion adapted to be mounted in contiguous relation to a horizontal surface portion of a vehicle and a longitudinally extending slot in the upper surface of the slat communicating with the hollow interior of the slat;
(B) an end cap member including,
  (1) a main body portion having a height exceeding the height of said slat and defining a generally vertical abutment surface at one end thereof positioned against a terminal end of said slat to close that end of said slat and position the upper surface of the main body portion above the upper surface of said slat; and
  (2) an attachment portion projecting from said abutment surface of said main body portion and sized to be received in the hollow of said slat; and
(C) a tie down member positioned on said slat adjacent said terminal end thereof in abutting relation to said end cap member and including an eyelet portion
  (1) having an upper surface extending generally horizontally from one end to a second end thereof,
  (2) defining a transverse opening below said upper surface thereof and above the upper surface of said slat for receipt of a tie down device,
  (3) defining a generally vertical abutment surface at said one end thereof below said upper surface thereof for abutting engagement above said slat with said generally vertical abutment surface on said main body portion of said end cap member,
  (4) having a height such that said upper surface thereof is positioned at the height of the upper surface of the main body portion of the end cap member, and
  (5) having a cross-sectional configuration at the point of abutment with the end cap member that generally conforms to the cross-sectional configuration of the abutting upper surface of the main body portion of said end cap member to define a generally flush, continuous upper surface therewith;

(D) said tie down member including a portion positioned slidably in the hollow of said slat;

(E) a tab being struck upwardly from said slat base portion and said tab being positioned to snap into abutting locking relation to the end of said tie down member remote from said end cap member as said tie down member is slid into abutting relation with said end cap member.

6. An automotive article carrier assembly comprising:
(A) a hollow slat including a base portion adapted to be mounted in contiguous relation to a horizontal surface portion of a vehicle and a longitudinally extending slot in the upper surface of the slat communicating with the hollow interior of the slat;
(B) an end cap member including,
  (1) a main body portion having a height exceeding the height of said slat and defining a generally vertical abutment surface at the rearward end thereof positioned against a terminal end of said slat to close that end of said slat and position the upper surface of the main body portion above the upper surface of said slat; and
  (2) an attachment portion projecting from said abutment surface of said main body portion and sized to be received in the hollow of said slat; and
(C) a tie down member positioned on said slat adjacent said terminal end thereof in abutting relation to said end cap member and including an eyelet portion
  (1) having an upper surface extending generally horizontally from one end to a second end thereof,
  (2) defining a transverse opening below said upper surface thereof and above the upper surface of said slat for receipt of a tie down device,
  (3) defining a generally vertical abutment surfae at said one end thereof below said upper surface thereof for abutting engagement above said slat with said generally vertical abutment surface on said main body portion of said end cap member,
  (4) having a height such that said upper surface thereof is positioned at the height of the upper surface of the main body portion of the end cap member, and
  (5) having a cross-sectional configuration at the point of abutment with the end cap member that generally conforms to the cross-sectional configuration of the abutting upper surface of the main body portion of said end cap member to define a generally flush, continuous upper surface therewith;

(D) said tie down member including a key portion positioned slidably in the hollow of said slat;

(E) a depression being provided in the lower face of said key portion for snapping coaction with the rounded head of a screw used to fasten said slat to the surface portion of the vehicle.

* * * * *